United States Patent [19]

Lee et al.

[11] Patent Number: 5,327,319

[45] Date of Patent: Jul. 5, 1994

[54] COMMON MODE VOLTAGE SURGE PROTECTION CIRCUITRY

[75] Inventors: Victor K. Lee, Plano; Donald B. Rose, Rockwell, both of Tex.

[73] Assignee: AT&T Bell Laboratories, Murray Hill, N.J.

[21] Appl. No.: 47,770

[22] Filed: Apr. 16, 1993

Related U.S. Application Data

[63] Continuation of Ser. No. 750,381, Aug. 27, 1991, abandoned.

[51] Int. Cl.⁵ .................................................. H02H 9/04
[52] U.S. Cl. ..................................... 361/118; 361/120; 361/127; 361/56
[58] Field of Search ............... 361/120, 127, 118, 119, 361/111, 56

[56] References Cited

U.S. PATENT DOCUMENTS

| | | | |
|---|---|---|---|
| 3,824,431 | 7/1974 | Schlicke | 361/118 |
| 4,023,071 | 5/1977 | Fussell | 361/56 |
| 4,104,496 | 8/1978 | Koike et al. | 200/144 B |
| 4,271,446 | 6/1981 | Comstock | 361/56 |
| 4,563,720 | 1/1986 | Clark | 361/56 |
| 4,573,113 | 2/1986 | Oauman | 363/48 |
| 4,587,588 | 5/1986 | Goldstein | 361/54 |
| 4,628,394 | 12/1986 | Crosby et al. | 361/56 |
| 4,628,398 | 12/1986 | Cook | 361/56 |
| 4,695,916 | 9/1987 | Satoh et al. | 361/56 |
| 4,758,920 | 7/1988 | McCartney | 361/119 |
| 4,758,920 | 7/1993 | McCartney | 361/119 |
| 4,901,183 | 2/1990 | Lee | 361/56 |
| 4,999,594 | 3/1991 | Ingman | 333/181 |
| 5,016,135 | 5/1991 | Zylstra | 361/16 |
| 5,146,384 | 9/1993 | Markovic | 361/55 |

FOREIGN PATENT DOCUMENTS

| | | | |
|---|---|---|---|
| 0142128 | 11/1984 | European Pat. Off. | H02H 9/02 |
| 0291169 | 4/1988 | European Pat. Off. | H04M 3/18 |

OTHER PUBLICATIONS

"Circuit Design of Surge Protector for 200 kb/s Ping-Pong Transmission Equipment", Review of the Electrical Communication Laboratories, vol. 33, No. 2, 1986, pp. 364-372, Kajawara et al.

Primary Examiner—A. D. Pellinen
Assistant Examiner—S. W. Jackson
Attorney, Agent, or Firm—A. G. Steinmetz

[57] ABSTRACT

A common mode lightning protection circuit includes a series circuit including a Y-capacitor and breakdown device connected between a current carrying input line and the frame ground of the power supply. This arrangement permits the ready application of current carrying line-to-frame ground dielectric tests needed to meet predefined safety requirements.

8 Claims, 3 Drawing Sheets

COMMON MODE VOLTAGE SURGE PROTECTION CIRCUITRY

This application is a continuation of application Ser. No. 07/750,381, filed on Aug. 27, 1991 now abandoned.

Field of the Invention

This invention relates to lightning protection circuitry with a fast transient time and in particular to lightning protection circuits for power supplies whose operability is testable by application of high valued DC voltages.

BACKGROUND OF THE INVENTION

Lightning protection for power circuits has normally been provided with a high voltage breakdown device included in a series circuit connected across two current carrying leads supplying power input to the power circuit. The breakdown devices may include various semiconductor devices either singly or in combination including voltage clamping devices, metal oxide varistors and bidirectional zener diodes or such other devices such as gas discharge tubes. The Y-capacitor is a specially constructed capacitor whose construction allows the capacitor to withstand the stress of high voltage transient pulses. Y-capacitors are often connected between the input line and frame ground for the purpose of EMI suppression.

SUMMARY OF THE INVENTION

A common mode lightning protection circuit comprises a series circuit including a Y-capacitor and breakdown device connected between a current carrying input line and the frame ground of the power supply. The frame herein refers to the mechanical structure supporting components of the power unit. The frame ground is in turn directly connected to earth ground. This arrangement permits the ready application of current carrying line-to-frame ground dielectric tests needed to meet predefined safety requirements.

In other arrangements the individual breakdown device may include a plurality of parallel breakdown circuit devices, each responding with a different speed of lightning transient response and impulse energy. In one such arrangement, two series connected devices, a varistor and a gas tube are included to provide a fast response and high energy absorption. A breakdown triac may be added in parallel with one of the devices to handle high power surges. This parallel arrangement also allows the triac to quench more rapidly after firing and additionally facilitates production dielectric testing of the circuit with the power supply Y-capacitor in place.

DETAILED DESCRIPTION

Figure 1:
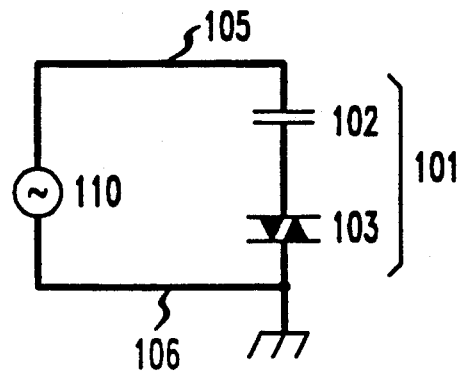
FIGS. 1 through 6 are schematics of a family of various series circuit arrangements embodying the principles of the invention.
Figure 2:
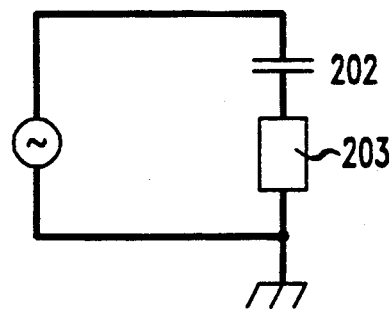

A series circuit 101 comprising a Y-capacitor 102 and a metal oxide varistor (MOV) 103 is shown in FIG. 1. This series circuit 101 is connected between a current carrying line 105 and a frame ground 106. A surge voltage source 110 is also shown connected from the current carrying line to a frame or earth ground. This surge voltage source may be a lighting strike or a high voltage applied in a dielectric test.

The Y-capacitor 102 is a specially constructed capacitor capable of safely handling very high surge or transient voltages. Its construction is designed to permit it to withstand the stress of very high voltage transient pulses.

The addition of the Y-capacitor allows high peaked voltage surges, such as a lightening hit, to be applied directly to the breakdown device 103 since the Y-capacitor 102 acts as a short circuit at the high frequency of the peaked voltage surge. The MOV consequently absorbs all of the transient voltage. When the transient voltage reaches the breakdown threshold of the MOV 103, the MOV 103 begins to conduct and clamps the voltage to a low value determined by the breakdown voltage characteristics of the MOV 103.

Safety testing requires the application of a large DC voltage between the current carrying line 105 and the frame ground 106. A typical voltage value may be 2250 volts DC such as required by UL dielectric tests. During this test the Y-capacitor operates as an open circuit and prevents the MOV 103 from conducting, hence assuring that the UL test requirement is fully met.

Another version of the circuit is shown in which a voltage clamping device 203 such as a semiconductor breakdown diode is connected in series with the Y-capacitor 202. As described above the high frequency response of the Y-capacitor 202 allows high frequency surge voltages to be applied to the breakdown diode 203 while large DC test voltages are blocked from application to the breakdown diode 203.

Figure 3:
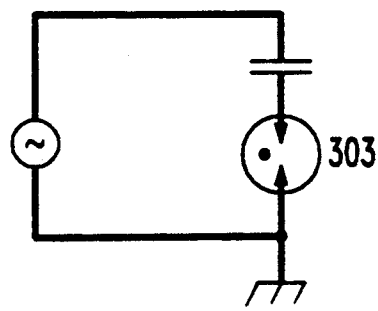

The arrangement of FIG. 3 uses a gas tube 303 as a surge current protection device. The gas tube is useful in applications requiring high current handling capacity. As soon as the gas tube fires, current flows through the gas tube at a low voltage with the voltage being determined by the tube characteristics.

Figure 4:
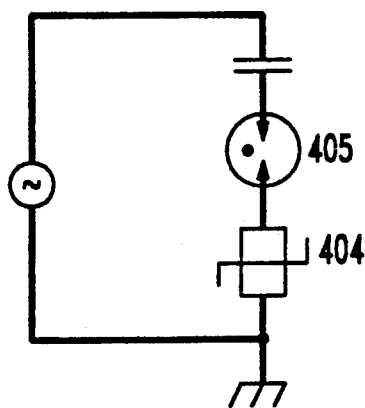

A semiconductor clamping device 404 is connected in series with the gas tube 405 in the arrangement of FIG. 4. This is added to enhance the quenching of the gas tube 405 by utilizing the high resistance characteristic of the semiconductor clamping device 404 to limit a follow-on current and allow the gas tube 405 to reliably quench.

Figure 5:
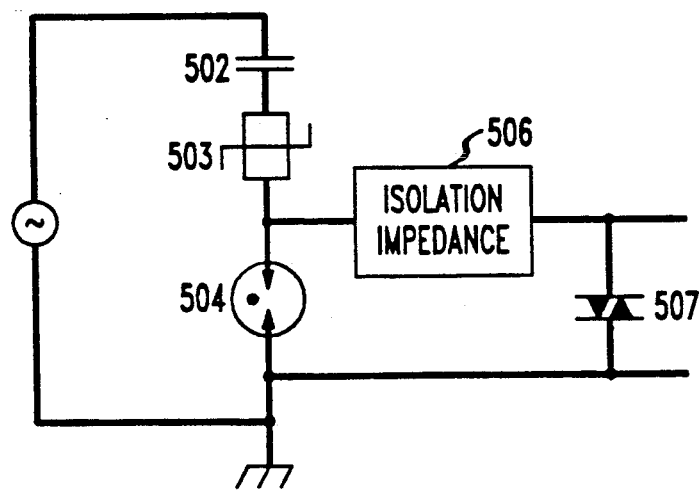
Figure 6:
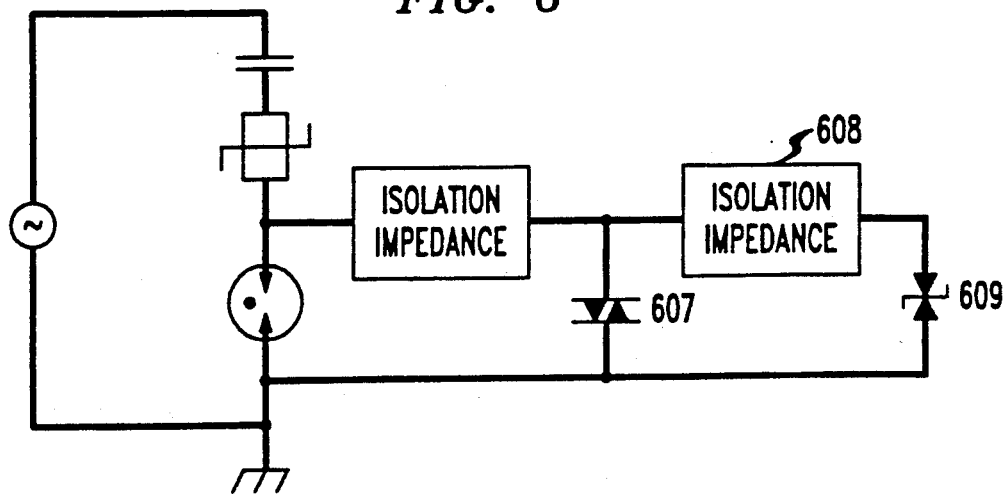

The arrangement of FIGS. 5 and 6 are configured for application to situations where the circuit may be exposed to very high energy lightning and/or a high energy DC voltage test. The arrangement of FIG. 5 includes a semiconductor voltage clamping device 503, a Y-capacitor 502 and a gas tube 504 all connected in series. A series connected isolation impedance 506 and MOV 507 is connected in parallel with the gas tube 504. This parallel arrangement permits high current surges to be handled by the clamping device 503 and gas tube 504 and excess energy to be handled by the MOV 507. The apparatus of FIG. 6 adds yet another series connected isolation impedance 608 and a back-to-back connected zener diode 609 across the MOV 607 to further enhance the handling of high energy clamping capability.

Figure 7:
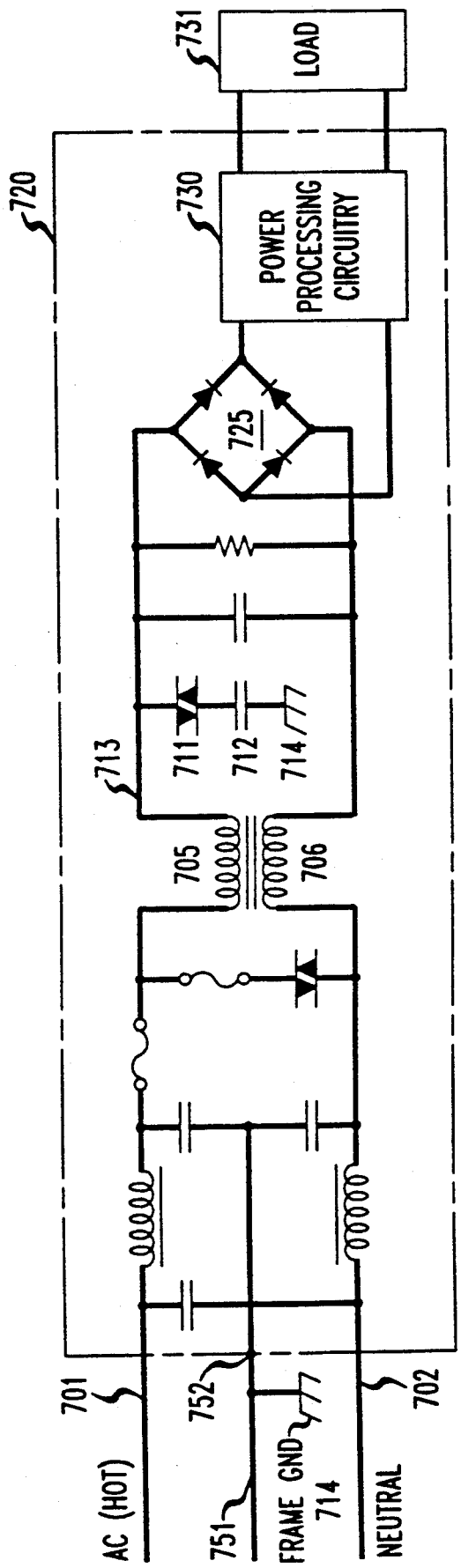
FIG. 7 is a schematic of a power supply with a voltage surge suppressor and a Y-capacitor embodying the principles of the invention.

A schematic of a power supply powered off of an AC power line is shown in the FIG. 7. The input power is supplied by an input AC "hot" line 701 and a neutral or return line 702. Two coupled longitudinal inductors 705 and 706 connect these lines to a series connection of an MOV 711 and Y-capacitor 712 connecting the hot current carrying line 713 to the frame ground 714. The frame is the mechanical support for the power supply 720 and its components. The frame ground 714 is electrically connected to the frame ground line 751 which is connected by the electrical node 752 to the frame or chassis 720 of the power supply. The frame ground is also connected to earth ground. The current carrying line 713 is coupled to a rectifier 725 which in turn provides a rectified voltage to the power processing circuitry 730. A load 731 is connected to the output of the power processing circuitry.

We claim:

1. In a power supply adapted to be powered by a source of AC energy; circuitry comprising
    power processing circuitry for modifying voltage and current levels of the energy supplied by the source;
    input circuitry including a power current carrying hot line, a neutral line, and a ground line and a rectifier connected to the hot and neutral line by first and second coupled longitudinal inductors, and the rectifier connecting the source of AC energy to the power processing circuitry and including;
    an infrastructure for supporting electrical components of the power processing circuitry and input circuitry and connected to a ground, in common with the neutral line to be operative as a reference ground;
    transient voltage surge protection circuitry connected to the power current carrying hot line between the source of AC energy and the rectifier of the input circuitry, and interconnecting the power current carrying hot line and the reference ground of the infrastructure; and the neutral line and including:
        a voltage responsive breakdown apparatus and a Y-capacitor connected in series circuit and the Y-capacitor and connecting the power current carrying hot line to the reference ground and having sufficient capacitance to function as an open circuit at dielectric voltage test levels and to facilitate surge current conduction at voltage levels due to lightning surges.

2. In a power supply adapted to be powered by a source of AC energy as claimed in claim 1:
    wherein the voltage responsive breakdown apparatus comprises a semiconductor voltage breakdown device.

3. In a power supply adapted to be powered by a source of AC energy as claimed in claim 1:
    wherein the voltage responsive breakdown apparatus comprises a metal-oxide varistor.

4. In a power supply adapted to be powered by a source of AC energy as claimed in claim 1:
    wherein the voltage responsive breakdown apparatus comprises a gas tube voltage breakdown device.

5. In a power supply adapted to be powered by a source of AC energy as claimed in claim 1:
    wherein the voltage responsive breakdown apparatus comprises a back-to-back zener diode device.

6. In a power supply adapted to be powered by a source of AC energy as claimed in claim 1:
    wherein the voltage responsive breakdown apparatus comprises a gas tube voltage breakdown device and a semiconductor voltage breakdown device connected in series.

7. In a power supply adapted to be powered by a source of AC energy as claimed in claim 6:
    wherein the voltage responsive breakdown apparatus further comprises a secondary breakdown apparatus connected in parallel with the gas tube and operative at a different energy level than an energy level at which the gas tube is operative.

8. In a power supply adapted to be powered by a source of AC energy as claimed in claim 7:
    wherein the voltage responsive breakdown apparatus further comprises a tertiary breakdown apparatus connected in parallel with the secondary breakdown apparatus and operative at a different energy level from that of the gas tube and the secondary breakdown apparatus.

* * * * *